United States Patent
Gurley et al.

(10) Patent No.: US 7,784,072 B2
(45) Date of Patent: Aug. 24, 2010

(54) APPARATUS HAVING AN EMERGENCY ALERT FUNCTION WITH SINGLE BUTTON CONTROL

(75) Inventors: Thomas David Gurley, Indianapolis, IN (US); Thomas Dale Yost, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 529 days.

(21) Appl. No.: 10/551,404

(22) PCT Filed: Mar. 30, 2004

(86) PCT No.: PCT/US2004/009641
§ 371 (c)(1),
(2), (4) Date: Sep. 29, 2005

(87) PCT Pub. No.: WO2004/093430
PCT Pub. Date: Oct. 28, 2004

(65) Prior Publication Data
US 2006/0271952 A1     Nov. 30, 2006

Related U.S. Application Data

(60) Provisional application No. 60/459,313, filed on Apr. 1, 2003.

(51) Int. Cl.
H04N 7/10     (2006.01)
(52) U.S. Cl. .......................................... 725/33; 725/32
(58) Field of Classification Search .................... 725/33
See application file for complete search history.

(56) References Cited

U.S. PATENT DOCUMENTS

| 5,121,430 | A | * | 6/1992 | Ganzer et al. ............... 380/258 |
| 6,177,873 | B1 | | 1/2001 | Cragun |
| 6,204,761 | B1 | | 3/2001 | Vanderable |
| 6,278,375 | B1 | | 8/2001 | Hucker |
| 6,543,051 | B1 | * | 4/2003 | Manson et al. ................. 725/33 |
| 7,185,282 | B1 | * | 2/2007 | Naidoo et al. ............... 715/718 |
| 2003/0093789 | A1 | * | 5/2003 | Zimmerman et al. .......... 725/34 |
| 2004/0048573 | A1 | | 3/2004 | Clark |

(Continued)

FOREIGN PATENT DOCUMENTS

WO     WO 01/45386     6/2001

(Continued)

OTHER PUBLICATIONS

Int'l Search Report.

*Primary Examiner*—Christopher Kelley
*Assistant Examiner*—Franklin S Andramuno
(74) *Attorney, Agent, or Firm*—Robert D. Shedd; Joseph J. Opalach; Brian J. Cromarty (57) ABSTRACT

An apparatus such as a television signal receiver, radio or other device provides an emergency alert function. According to an exemplary embodiment, the apparatus includes a tuner for tuning a channel frequency that provides emergency alert signals indicating an emergency event. A processor enables an alert output responsive to the emergency alert signals. A single user input button receives tactile user inputs to control the emergency alert function. The single user input button is the only tactile user input means integral with the apparatus that is capable of controlling the emergency alert function.

18 Claims, 5 Drawing Sheets

400

| INITIAL CONDITION | EMERGENCY ALERT FUNCTION ACTIVATED? | BUTTON STATE | OPERATION(S) PERFORMED |
|---|---|---|---|
| OFF | YES | 1 | TURN TV ON |
| | | | STOP ALARM |
| | | | TURN OFF LEDS |
| | | | PLAY NWR |
| | | | BLANK TV VIDEO |
| | | | DISPLAY MESSAGE |
| | | 2 | TURN TV OFF |
| | NO | 1 | PLAY NWR |
| | | 2 | TURN AUDIO OFF |
| ON | YES | 1 | STOP ALARM |
| | | | TURN OFF LEDS |
| | | | PLAY NWR |
| | | | DISPLAY MESSAGE |
| | | 2 | RESTORE AUDIO |
| | | | REMOVE MESSAGE |
| | NO | 1 | PLAY NWR |
| | | 2 | RESTORE AUDIO |

U.S. PATENT DOCUMENTS

2004/0123316 A1 6/2004 Kendall et al.
2006/0082690 A1* 4/2006 Englert ....................... 348/731

FOREIGN PATENT DOCUMENTS

WO  WO 03/096671  11/2003
WO  WO 03/096672  11/2003
WO  WO 03/096693  11/2003

* cited by examiner

| INITIAL CONDITION | EMERGENCY ALERT FUNCTION ACTIVATED? | BUTTON STATE | OPERATION(S) PERFORMED |
|---|---|---|---|
| OFF | YES | 1 | TURN TV ON |
| | | | STOP ALARM |
| | | | TURN OFF LEDS |
| | | | PLAY NWR |
| | | | BLANK TV VIDEO |
| | | | DISPLAY MESSAGE |
| | | 2 | TURN TV OFF |
| | NO | 1 | PLAY NWR |
| | | 2 | TURN AUDIO OFF |
| ON | YES | 1 | STOP ALARM |
| | | | TURN OFF LEDS |
| | | | PLAY NWR |
| | | | DISPLAY MESSAGE |
| | | 2 | RESTORE AUDIO |
| | | | REMOVE MESSAGE |
| | NO | 1 | PLAY NWR |
| | | 2 | RESTORE AUDIO |

APPARATUS HAVING AN EMERGENCY ALERT FUNCTION WITH SINGLE BUTTON CONTROL

This application claims the benefit under 35 U.S.C. 365 § of International Application PCT/US04/09641, filed Mar. 30, 2004, which was published in accordance with PCT Article 21(2) on Oct. 28, 2004 in English and which claims the benefit of U.S. provisional patent application No. 60/459,313, filed Apr. 1, 2003.

The present invention generally relates to apparatuses such as television signal receivers, radios or other apparatuses having an emergency alert function that is capable of alerting individuals of emergency events, and more particularly, to an apparatus having an emergency alert function that may be controlled by users via a single button.

Emergency events such as severe weather, natural disasters, fires, civil emergencies, war acts, toxic chemical spills, radiation leaks, or other such conditions can be devastating to unprepared individuals. With weather-related emergencies, authorities such as the National Weather Service (NWS) and the National Oceanographic and Atmospheric Administration (NOAA) are generally able to detect severe weather conditions prior to the general public. Through the use of modern weather detection devices, such as Doppler radar and weather satellites, the NWS and NOAA are able to issue early warnings of severe weather conditions which have saved many lives. However, for such warnings to be effective, they must be communicated to their intended recipients.

Certain apparatuses are capable of receiving emergency alert signals provided by sources such as the NWS and NOAA, and provide an emergency alert function using Specific Area Message Encoding (SAME) technology. Apparatuses using SAME technology typically require a user to perform a setup process for the emergency alert function by selecting items such as a channel frequency which is monitored in order to receive emergency alert signals, one or more geographical areas of interest, and one or more types of emergency events which activate the emergency alert function. Once the setup process is complete, the emergency alert function may be activated when incoming emergency alert signals including SAME data indicate the occurrence of an emergency event which corresponds to the geographical area(s) and types of emergency event selected by the user during the setup process. When the emergency alert function is activated, one or more alert outputs such as an audio and/or visual message may be provided to alert individuals of the emergency event.

Certain apparatuses using technology such as SAME technology may include a plurality of user input buttons and lights associated with the emergency alert function. For example, certain television signal receivers manufactured by Thomson Inc. provide an emergency alert function using a system known as Alert Guard™ which includes three user input buttons and four light emitting diodes (LEDs) on their front panel assembly (FPA). These three user input buttons include labels such as "View Message," "Hear Voice" and "Stop Alarm" and may be manipulated by users to control certain functions associated with the Alert Guard™ system. The four LEDs also have labels such as "Ready," "Advisory," "Watch" and "Warning" and may be illuminated to indicate the severity or alert levels of emergency events.

The inclusion of multiple user input buttons and lights on the FPA of an apparatus for an emergency alert function in the manner described above may be disadvantageous for various reasons. For example, multiple user input buttons and lights may render the emergency alert function more difficult for users to operate. In particular, users may be confused as to what buttons to use in order to control various aspects of the emergency alert function. Also, for certain apparatuses such as high-end, low-volume television signal receivers, the inclusion of multiple user input buttons and lights on the FPA may be prohibitive on the basis of increased tooling costs. In particular, since such television signal receivers are produced in relatively low volumes, any significant tool change, such as one necessary to accommodate a plurality of additional buttons and lights, can be cost prohibitive. Moreover, a key selling feature of such high-end television signal receivers is a very clean, slick front panel appearance, namely one that is not cluttered with multiple buttons and lights.

Accordingly, there is a need for an apparatus having an emergency alert function which avoids the foregoing problems, and thereby provides, among other things, an improved means for controlling the emergency alert function. The present invention described herein addresses the foregoing and/or other issues.

In accordance with an aspect of the present invention, an apparatus having an emergency alert function is disclosed. According to an exemplary embodiment, the apparatus comprises tuning means for tuning a channel frequency that provides emergency alert signals indicating an emergency event. Processing means enable an alert output responsive to the emergency alert signals. A single user input button is provided for receiving tactile user inputs to control the emergency alert function. The single user input button is the only tactile user input means integral with the apparatus that is capable of controlling the emergency alert function.

In accordance with another aspect of the present invention, a method for controlling an apparatus having an emergency alert function is disclosed. According to an exemplary embodiment, the method comprises steps of tuning a channel frequency that provides emergency alert signals indicating an emergency event, providing an alert output responsive to the emergency alert signals, and receiving tactile user inputs to control the emergency alert function via a single user input button. The single user input button is the only tactile user input means integral with the apparatus that is capable of controlling the emergency alert function.

In accordance with yet another aspect of the present invention, a television signal receiver having an emergency alert function is disclosed. According to an exemplary embodiment, the television signal receiver comprises a tuner operative to tune a channel frequency that provides emergency alert signals indicating an emergency event. A processor is operative to enable an alert output responsive to the emergency alert signals. A single user input button is operative to receive tactile user inputs to control the emergency alert function. The single user input button is the only tactile user input element integral with the television signal receiver that is capable of controlling the emergency alert function.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
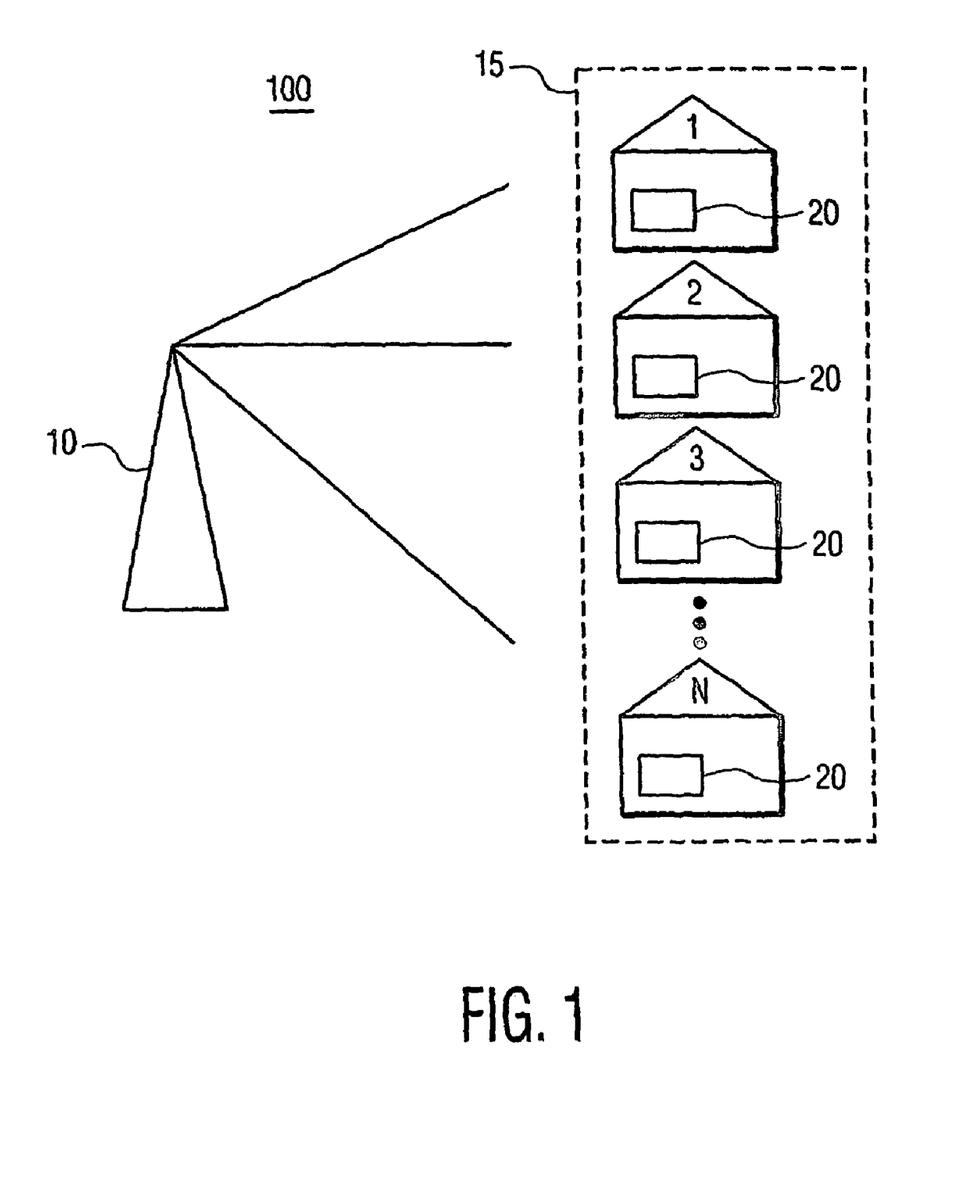
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises signal transmission means such as signal transmission source 10, dwelling means such as dwelling units 15 (i.e., 1, 2, 3 . . . N, where N may be any positive integer), and signal receiving means such as television signal receivers 20.

In FIG. 1, dwelling units 15 may represent residences, businesses and/or other dwelling places located within a particular geographical area, such as but not limited to, a particular continent, country, region, state, area code, zip code, city, county, municipality, subdivision, and/or other definable geographical area. According to an exemplary embodiment, each of the dwelling units 15 is equipped with at least one television signal receiver 20 having an emergency alert function. According to the present invention, the emergency alert function enables, among other things, television signal receiver 20 to receive emergency alert signals and provide one or more alert outputs to notify individuals of an emergency event. For purposes of example, the present invention will be described herein with reference to television signal receiver 20. However, the principles of the present invention may also be used by other apparatuses, such as radios.

According to an exemplary embodiment, signal transmission source 10 transmits signals including audio, video and/or emergency alert signals which may be received by each television signal receiver 20. According to an exemplary embodiment, the emergency alert signals may be provided from an authority such as the NWS, or other authorities such as governmental entities or the like. Signal transmission source 10 may transmit the emergency alert signals in their original form as provided by the authority, or may append digital data representative of the emergency alert signals to other data, or may modify the emergency alert signals in some manner appropriate for its specific transmission format needs. In response to the emergency alert signals, each television signal receiver 20 may provide one or more alert outputs to thereby notify individuals of the emergency event. Signal transmission source 10 may transmit signals to television signal receivers 20 via any wired or wireless link such as, but not limited to, terrestrial, cable, satellite, fiber optic, digital subscriber line (DSL), and/or any other type of broadcast and/or multicast means.

Figure 2:
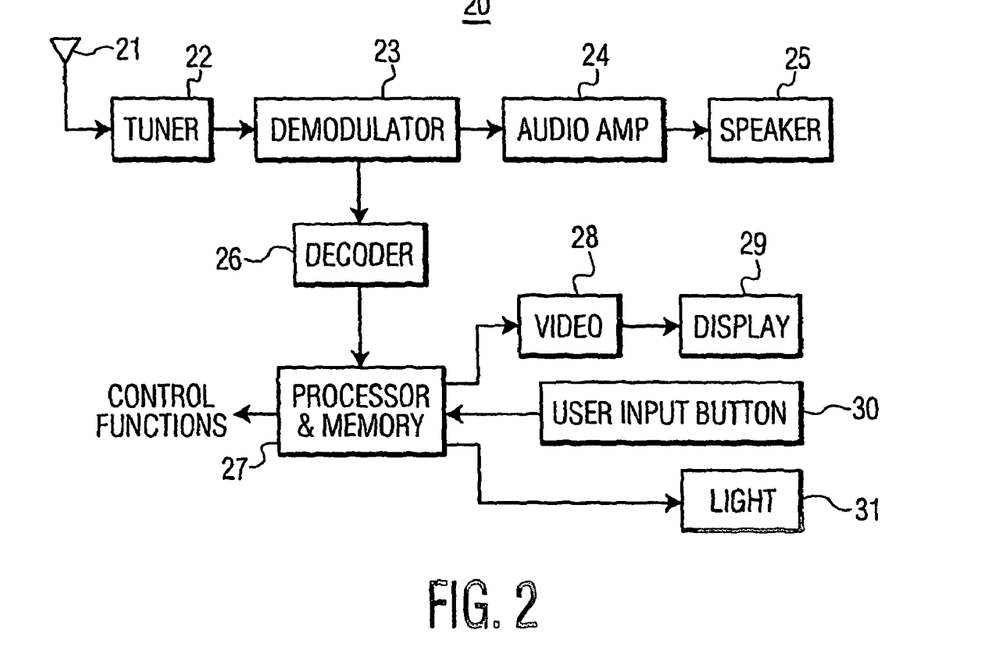
FIG. 2 is a block diagram of a television signal receiver according to an exemplary embodiment of the present invention.

Referring to FIG. 2, a block diagram of an exemplary embodiment of television signal receiver 20 of FIG. 1 is shown. In FIG. 2, television signal receiver 20 comprises signal receiving means such as signal receiving element 21, tuning means such as tuner 22, demodulation means such as demodulator 23, audio amplification means such as audio amplifier 24, audio output means such as speaker 25, decoding means such as decoder 26, processing means and memory means such as processor and memory 27, video processing means such as video processor 28, visual output means such as display 29, user input means such as user input button 30, and illuminating means such as light 31. Some of the foregoing elements may for example be embodied using integrated circuits (ICs). For clarity of description, conventional elements of television signal receiver 20 such as certain control signals, power signals, and/or other elements may not be shown in FIG. 2.

Signal receiving element 21 is operative to receive signals including audio, video and/or emergency alert signals from signal sources, such as signal transmission source 10 in FIG. 1. According to an exemplary embodiment, received audio signals may include digitally encoded emergency alert signals. According to another exemplary embodiment, emergency alert signals may be received as separate data packets in a digital transmission system. Signal receiving element 21 may be embodied as any signal receiving element such as an antenna, input terminal or other element.

Tuner 22 is operative to tune signals including audio, video and/or emergency alert signals. According to an exemplary embodiment, tuner 22 may be capable of tuning audio signals on at least the following designated NWS frequencies: 162.400 MHz, 162.425 MHz, 162.450 MHz, 162.475 MHz, 162.500 MHz, 162.525 MHz and 162.550 MHz. As previously indicated herein, such audio signals may include digitally encoded emergency alert signals. Tuner 22 may also tune other channel frequencies including those used in terrestrial, cable, satellite and/or other transmissions.

Demodulator 23 is operative to demodulate signals provided from tuner 22, and may demodulate signals in analog and/or digital transmission formats. According to an exemplary embodiment, demodulator 23 demodulates audio signals to thereby generate demodulated audio signals representing audio content such as an NWS audio message, a warning alert tone and/or other audio content. Audio amplifier 24 is operative to amplify the audio signals output from demodulator 23 responsive to one or more control signals provided from processor 27. Speaker 25 is operative to aurally output the amplified audio signals provided from audio amplifier 24.

Decoder 26 is operative to decode signals including audio, video and/or emergency alert signals. According to an exemplary embodiment, decoder 26 decodes audio signals to thereby extract digitally encoded frequency shift keyed (FSK) signals, which represent emergency alert signals indicating an emergency event. According to another exemplary embodiment, decoder 26 decodes digital data which represents emergency alert signals indicating an emergency event. Decoder 26 may also perform other decoding functions, such as decoding data which represents emergency alert signals included in the vertical blanking interval (VBI) of an analog television signal.

According to an exemplary embodiment, the emergency alert signals include data comprising SAME data associated with the emergency event. SAME data comprises a digital code representing information such as the specific geographical area affected by the emergency event, the type of emergency event (e.g., tornado watch, radiological hazard warning, civil emergency, etc.), and the expiration time of the event alert. SAME data is used by the NWS and other authorities to improve the specificity of emergency alerts and to decrease the frequency of false alerts. Other data and information may also be included in the emergency alert signals according to the present invention.

Processor and memory 27 are operative to perform various signal processing and data storage functions of television signal receiver 20. According to an exemplary embodiment, processor 27 receives the emergency alert signals from decoder 26 and determines whether the emergency alert function of television signal receiver 20 is activated based on data included in the emergency alert signals. According to this exemplary embodiment, processor 27 compares data in the emergency alert signals to user setup data stored in memory 27 to determine whether the emergency alert function is activated. As will be described later herein, a setup process for the emergency alert function of television signal receiver 20 allows a user to select items such as an applicable geographical area(s), and type(s) of emergency events (e.g., tornado watch, radiological hazard warning, civil emergency, etc.) which activate the emergency alert function. When the emergency alert function of television signal receiver 20 is activated, processor 27 outputs one or more control signals which enable various operations. According to an exemplary embodiment, such control signals enable one or more alert outputs (e.g., aural and/or visual) to thereby notify individuals of the emergency event.

Processor 27 is also operative to enable various other operations associated with the emergency alert function of television signal receiver 20. According to an exemplary embodiment, processor 27 outputs one or more control signals responsive to a user input via user input button 30 to thereby enable one or more operations of television signal receiver 20. Further details regarding this aspect of the present invention will be provided later herein.

Video processor 28 is operative to process signals including video signals. According to an exemplary embodiment, such video signals may include embedded messages such as NWS text messages and/or other messages that provide details regarding emergency events. Video processor 28 may include closed caption circuitry which enables closed caption displays. Display 29 is operative to provide visual displays corresponding to processed signals provided from video processor 28. According to an exemplary embodiment, display 29 may provide visual displays including the aforementioned messages that provide details regarding emergency events.

User input button 30 is operative to receive tactile user inputs that control various operations associated with the emergency alert function of television signal receiver 20. According to an exemplary embodiment, user input button 30 is the only tactile user input means integral with television signal receiver 20 that is capable of controlling the emergency alert function. That is, user input button 30 is the only tactile user input mechanism physically connected to television signal receiver 20 that is capable of controlling the emergency alert function. However, the emergency alert function may also be controlled by users via a wireless remote control device associated with television signal receiver 20.

According to an exemplary embodiment, user input button 30 may be located on a FPA of television signal receiver 20. In this manner, user input button 30 provides users with a convenient means for controlling the emergency alert function, while facilitating a clean, slick, uncluttered appearance for the FPA of television signal receiver 20. As previously indicated herein, a FPA having a clean, slick and uncluttered appearance may be an important selling feature of high-end television signal receivers. Moreover, the inclusion of only a single button for controlling the emergency alert function may also reduce tooling costs associated with the manufacture of television signal receiver 20.

Also according to an exemplary embodiment, user input button 30 operates as a toggle switch having a plurality of states. For purposes of example and explanation, user input button 30 will be described herein as having two states, although it will be intuitive to those skilled in the art that user input button 30 may be implemented having more than two states. User input button 30 may also be programmed by a user during the setup process for the emergency alert function of television signal receiver 20. In this manner, users may define the functionality to be provided by user input button 30. Further details regarding this aspect of user input button 30 will be provided later herein.

Light 31 is operative to provide visual outputs including visual outputs associated with the emergency alert function of television signal receiver 20. According to an exemplary embodiment, light 31 is operative to illuminate user input button 30 based on the severity or alert levels of emergency events (e.g., advisory, watch, warning, etc.) as indicated by received emergency alert signals. As will be described later herein, light 31 may illuminate user input button 30 using various different predetermined color schemes. In this manner, light 31 can effectively and efficiently communicate information associated with the emergency alert function to users, including information regarding the severity or alert levels of emergency events. Light 31 may be contained within the structure of user input button 30, or may be separate from user input button 30, and may for example be embodied using one or more LEDs and/or other illuminating element(s).

Figure 3:
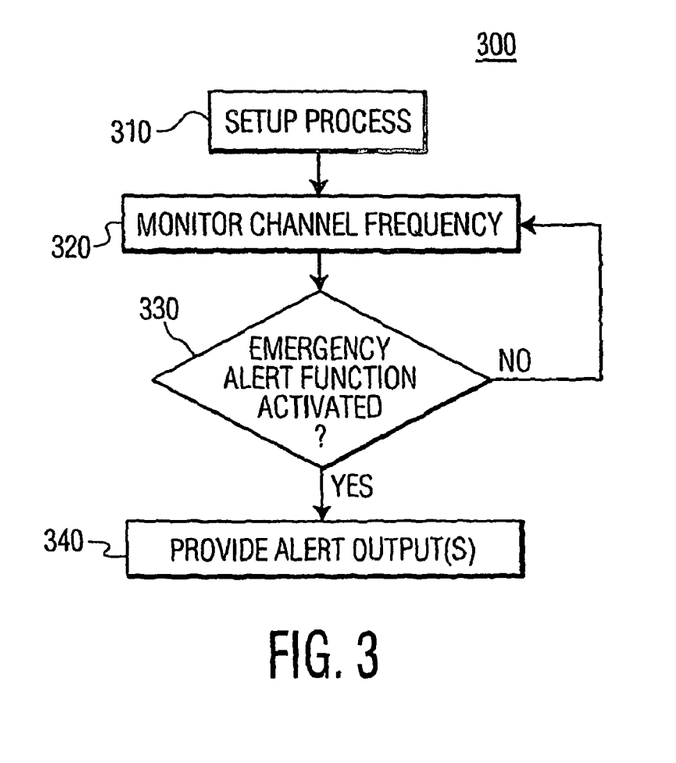
FIG. 3 is a flowchart illustrating the general operation of the emergency alert function according to an exemplary embodiment of the present invention.

Referring now to FIG. 3, a flowchart 300 illustrating the general operation of the emergency alert function according to an exemplary embodiment of the present invention is shown. For purposes of example and explanation, the steps of FIG. 3 will be described with reference to television signal receiver 20 of FIG. 2. The steps of FIG. 3 are merely exemplary, and are not intended to limit the present invention in any manner.

At step 310, a setup process for the emergency alert function of television signal receiver 20 is performed. According to an exemplary embodiment, a user performs this setup process by providing inputs to television signal receiver 20 (e.g., using a remote control device not shown) responsive to an on-screen menu displayed via display 29. Such an on-screen menu may for example be part of an electronic program guide (EPG) function of television signal receiver 20. According to an exemplary embodiment, the user may select at least the following items during the setup process at step 310:

A. Enable/Disable—The user may select whether to enable or disable the emergency alert function.

B. Channel Frequency—The user may select the channel frequency which is monitored in order to receive emergency alert signals. For example, the user may select a frequency such as one of the following NWS transmission frequencies: 162.400 MHz, 162.425 MHz, 162.450 MHz, 162.475 MHz, 162.500 MHz, 162.525 MHz and 162.550 MHz. According to an exemplary embodiment, a channel frequency may be manually selected by the user, or may be selected using an auto-tune mode which automatically tunes all of the channel frequencies associated with the emergency alert function to thereby identify one or more channel frequencies that provide the highest signal strength.

C. Geographical Areas—The user may select one or more geographical areas of interest. For example, the user may select a particular continent, country, region, state, area code, zip code, city, county, municipality, subdivision, and/or other definable geographical area. According to an exemplary embodiment, such geographical area(s) may be represented by location codes, such as Federal Information Processing Standard (FIPS) location codes.

D. Event Types—The user may select one or more types of emergency events which activate the emergency alert function. For example, the user may designate that events such as civil emergencies, radiological hazard warnings, and/or tornado warnings activate the emergency alert function, but that events such as a thunderstorm watch does not, etc. The user may also select whether the conventional warning audio tone provided by the NWS and/or other alert mechanism activates the emergency alert function. According to the present invention, different severity or alert levels (e.g., advisory, watch, warning, etc.) may represent different "events." For example, a thunderstorm watch may be considered a different event from a thunderstorm warning.

E. Alert Outputs—The user may select one or more alert outputs to be provided when the emergency alert function is activated. According to an exemplary embodiment, the user may select visual and/or aural outputs to be provided for each type of emergency event that activates the emergency alert function. For example, the user may select to display a visual message (e.g., an NWS text message as a closed caption display) and/or tune television signal receiver 20 to a specific channel. The user may also for example select to aurally output a warning or alarm tone (e.g., chime, siren, etc.) and/or an audio message (e.g., NWS audio message), and the desired volume of each. Moreover, the alert outputs may be selected on an event-by-event basis. Other types of alert outputs may also be provided according to the present invention.

F. User Input Button—The user may program user input button 30 and thereby define its functionality. According to an exemplary embodiment, the user may define modes of operation, including for example when television signal receiver 20 is turned on, turned off, and/or during playback of recorded audio and/or video content.

At step 330, a determination is made as to whether the emergency alert function of television signal receiver 20 is activated. According to an exemplary embodiment, processor 27 makes this determination by comparing data included in the incoming emergency alert signals to data stored in memory 27. As previously indicated herein, the emergency alert signals may include data such as SAME data which represents information including the type of emergency event (e.g., tornado watch, radiological hazard warning, civil emergency, etc.) and the specific geographical area(s) affected by the emergency event. According to an exemplary embodiment, processor 27 compares this SAME data to corresponding user setup data (i.e., items C and D of step 310) stored in memory 27 to thereby determine whether the emergency alert function is activated. In this manner, the emergency alert function of television signal receiver 20 is activated when the emergency event indicated by the emergency alert signals corresponds to: (1) the geographical area(s) selected by the user for item C of step 310 and (2) the event type(s) selected by the user for item D of step 310.

If the determination at step 330 is negative, process flow loops back to step 320 where tuner 22 continues to monitor the selected channel frequency. Alternatively, if the determination at step 330 is positive, process flow advances to step 340 where television signal receiver 20 provides one or more alert outputs to thereby notify individuals of the emergency event.

According to an exemplary embodiment, processor 27 enables the one or more alert outputs at step 340 in accordance with the user's selections during the setup process of step 310 (i.e., item E), and such alert outputs may be aural and/or visual in nature. For example, aural outputs such as a warning tone and/or an NWS audio message may be provided at step 340 via speaker 25, and the volume of such aural outputs may be controlled in accordance with the volume level set by the user during the setup process of step 310. Visual outputs may also be provided at step 340 via display 29 and/or light 31 to notify individuals of the emergency event. According to an exemplary embodiment, an auxiliary information display such as an NWS text message (e.g., as a closed caption display) and/or a video output from a the operations to be performed by television signal receiver 20 responsive to each depression of user input button 30, and such operations may be based on certain conditions, such as the initial condition of television signal receiver 20 (i.e., turned on or off), and whether the emergency alert function is activated (i.e., yes or no). An example of how user input button 30 may be programmed is represented in table 400 of FIG. 4. As indicated in table 400 for example, if television signal receiver 20 is turned off (i.e., initial condition off) and the emergency alert function is activated (i.e., yes), then one depression of user input button 30 (i.e., button state 1) will cause television signal receiver 20 to perform six different operations (i.e., turn TV on, stop alarm, turn off LEDs, play NWR, blank TV video, and display message). A second depression of user input button 30 (i.e., button state 2) under the same conditions will simply cause television signal receiver 20 to be turned off. The operations performed responsive to each depression of user input button 30 are enabled by processor 27.

Figure 4:
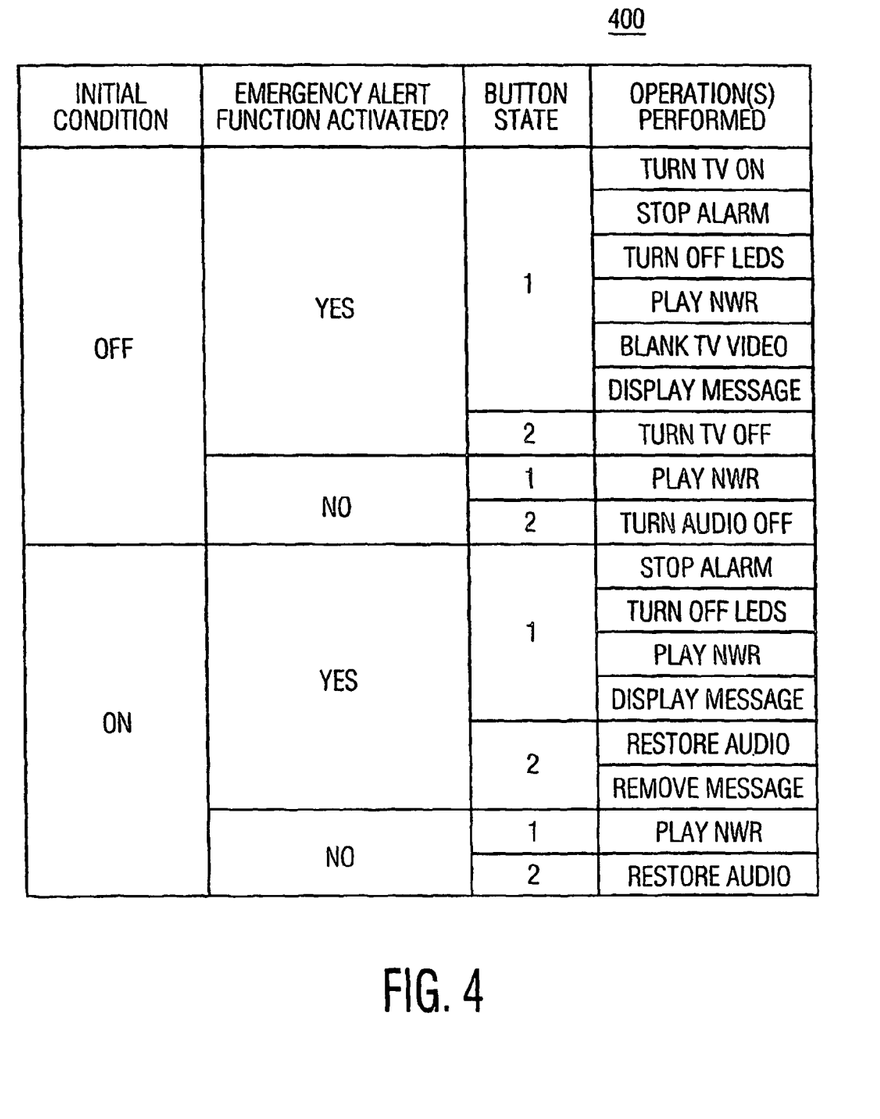
FIG. 4 is a table illustrating how the user input button of FIG. 2 may be programmed according to an exemplary embodiment of the present invention.

Table 400, or a similar table, may for example be provided as an on-screen menu via display 29 to facilitate the programming of user input button 30 via a remote control device (not shown). Moreover, default settings such as those shown in table 400 may be provided to simplify the process of programming user input button 30 for the user. Table 400 is an example only, and other types of information and/or conditions may also be used in order to program user input button 30. For example, user input button 30 may have more than two states wherein each state (i.e., depression) of user input button 30 causes different operations to be performed. In general, the manner in which user input button 30 may be programmed is a matter of design choice.

According to the present invention, other menu selections may also be provided at step 310 and/or some of the menu selections described above may be omitted. Data corresponding to the user's selections during the setup process of step 310 is stored in memory 27.

At step 320, television signal receiver 20 monitors the channel frequency selected by the user during the setup process of step 310 (i.e., item B) for emergency alert signals. According to an exemplary embodiment, tuner 22 monitors the selected channel frequency and thereby receives incoming emergency alert signals. According to the present invention, television signal receiver 20 is capable of monitoring a channel frequency and receiving emergency alert signals during all specific channel may be provided at step 340 via display 29 under the control of processor 27.

According to another exemplary embodiment, the alert output(s) provided at step 340 may be provided via light 31 based on the severity or alert level (e.g., advisory, watch, warning, etc.) of the particular emergency event, and the light output from light 31 may illuminate user input button 30. According to this exemplary embodiment, light 31 may use various different predetermined color schemes to communicate information regarding the emergency alert function to users, including information regarding the severity or alert levels of emergency events. Three exemplary color schemes that may be used by light 31 are represented in Table 1 below, where "G" represents green, "Y" represents yellow, "O" represents orange, and "R" represents red.

TABLE 1

| State or Severity Level | 1st Exemplary Color Scheme | 2nd Exemplary Color Scheme | 3rd Exemplary Color Scheme |
| --- | --- | --- | --- |
| Ready | GGGG | GGGG | GGGG |
| Advisory | GYGG | GYYY | GYGG |
| Watch | GGOG | GYOO | GYOG |
| Warning | GGGR | GYOR | GYOR |

As indicated in Table 1, a single color such as green may be used exclusively to indicate that the emergency alert function is in a "ready" (i.e., operative) state wherein the emergency alert function is not activated. When the emergency alert function is activated, this single color may be combined with one or more other colors to indicate the severity level of the emergency event. With the first exemplary color scheme of Table 1 for example, yellow is used to indicate that an emergency event is at an advisory level, orange is used to indicate that an emergency event is at a watch level, and red is used to indicate that an emergency event is at a warning level. In contrast, the second and third exemplary color schemes of Table 1 both use two colors to indicate that an emergency event is at an advisory level, three colors to indicate that an emergency event is at a watch level, and four colors to indicate that an emergency event is at a warning level. The color schemes represented in Table 1 are not intended to be exhaustive, and other color schemes may also be used according to the present invention.

Figure 5:
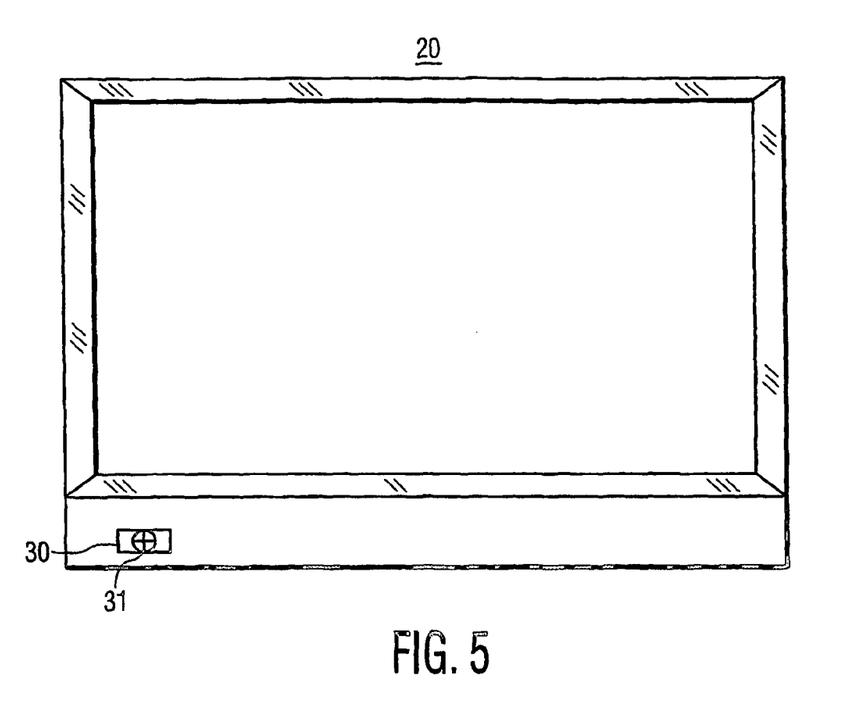
FIG. 5 is a diagram of the television signal receiver of FIG. 2 showing the light contained within the user input button according to an exemplary embodiment of the present invention.
Figure 6:
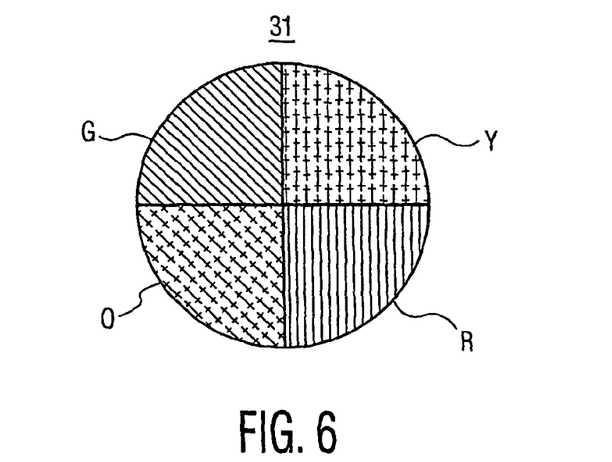
FIG. 6 is a diagram of the light of FIG. 2 according to an exemplary embodiment of the present invention.

As previously indicated herein, light 31 may be contained within the structure of user input button 30, or may be separate from user input button 30. For example, FIG. 5 is a diagram of television signal receiver 20 showing light 31 contained within the structure of user input button 30 according to an exemplary embodiment of the present invention. Light 31 of FIG. 5 may for example be embodied as a single light structure with a four color (e.g., G, Y, O, R) display, as shown in FIG. 6. The embodiment of light 31 shown in FIG. 6 may for example use one or more LEDs.

Figure 7:
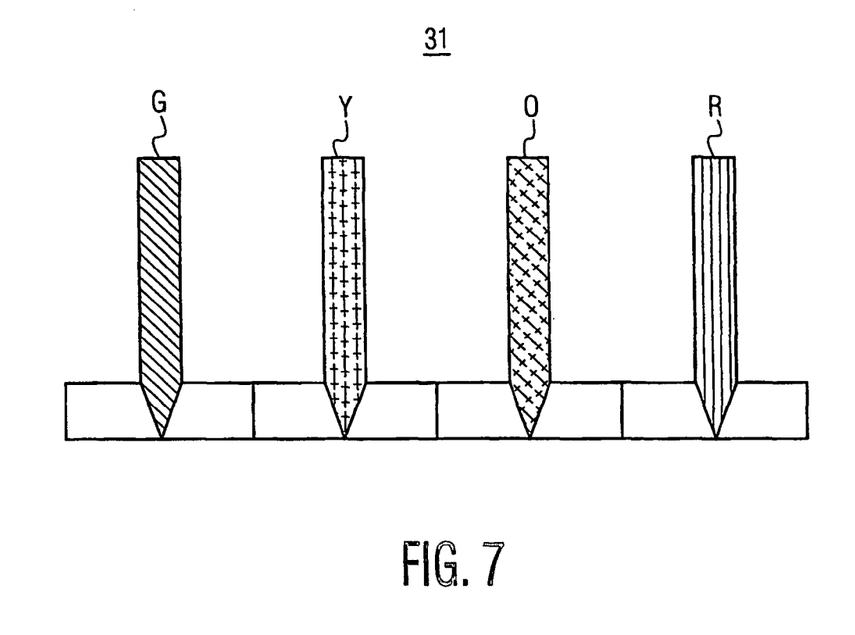
FIG. 7 is a diagram of the light of FIG. 2 according to another exemplary embodiment of the present invention.
Figure 8:
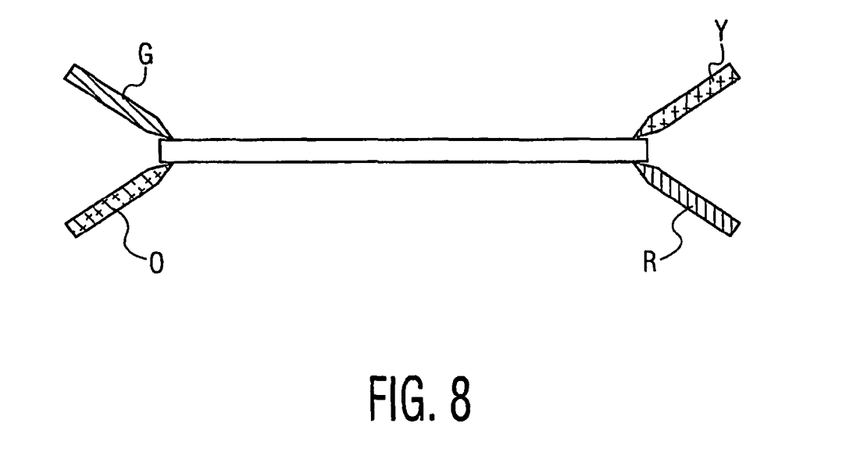
FIG. 8 is a diagram of the light of FIG. 2 according to still another exemplary embodiment of the present invention.

Alternatively, when separate from user input button 30, light 31 may for example be implemented as a top light, also known as a "porch light," which is placed in a slot within the FPA of television signal receiver 20 and continuously projects light downwardly upon user input button 30. With this implementation, light 31 and its slot may not be visible to users when viewing television signal receiver 20 from the front. FIGS. 7 and 8 show different exemplary embodiments of light 31 suitable for use as a porch light. In particular, the embodiment of light 31 shown in FIG. 7 depicts a multi-segmented, four color light pipe, while the embodiment of light 31 shown in FIG. 8 depicts a manifold, four color light pipe. The embodiments of light 31 shown in FIGS. 7 and 8 may for example use multiple LEDs. Other embodiments of light 31 may also be implemented according to the present invention.

Also at step 340, users may provide inputs via user input button 30 in the manner previously described herein to thereby control various operations of television signal receiver 20. As indicated in table 400 of FIG. 4 for example, if television signal receiver 20 is turned on (i.e., initial condition on) and the emergency alert function is activated (i.e., yes), then one depression of user input button 30 (i.e., button state 1) will cause television signal receiver 20 to perform four different operations (i.e., stop alarm, turn off LEDs, play NWR, and display message). A second depression of user input button 30 (i.e., button state 2) under the same conditions will cause television signal receiver 20 to perform another two operations (i.e., restore normal audio and remove message). The operations performed responsive to each depression of user input button 30 are enabled by processor 27.

As described herein, the present invention provides an apparatus having an emergency alert function that may be controlled by users via a single button. The present invention may be applicable to various apparatuses, either with or without a display device. Accordingly, the phrase "television signal receiver" as used herein may refer to systems or apparatuses capable of receiving and processing television signals including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A television signal receiving apparatus having an emergency alert function, comprising:
tuning means for tuning a channel frequency that provides emergency alert signals indicating an emergency event;
processing means for enabling an alert output responsive to said emergency alert signals; and
a single user input button for receiving tactile user inputs to control said emergency alert function, wherein said single user input button is the only tactile user input means integral with said apparatus that is capable of controlling said emergency alert function;
wherein, responsive to a first depression of said single user interface button when said television signal receiver is in an "off" state and said emergency alert function is activated, said processing means perform steps comprising turning said television signal receiver to an "on" state and presenting information based on said emergency alert signals, and wherein, responsive to a second depression of said single user input button, said processing means cause said television signal receiving apparatus to be returned to an "off" state wherein said single user input button includes: a plurality of different states; and said apparatus performs one or more operations responsive to each of said states based on user programming.

2. The apparatus of claim 1, further comprising illuminating means for illuminating said single user input button based on a severity level of said emergency event.

3. The apparatus of claim 2, wherein said illuminating means illuminates said single user input button using:
a first color if said severity level represents a first level;
a second color if said severity level represents a second level; and
a third color if said severity level represents a third level.

4. The apparatus of claim 3, wherein said first, second and third colors are each combined with a fourth color.

5. The apparatus of claim 4, wherein said illuminating means illuminates said single user input button using only said fourth color when said emergency alert function is not activated.

6. The apparatus of claim 2, wherein said illuminating means illuminates said single user input button using:
two colors if said severity level represents a first level;
three colors if said severity level represents a second level; and
four colors if said severity level represents a third level.

7. A method for operating a television signal receiving apparatus having an emergency alert function, comprising:
tuning a channel frequency that provides emergency alert signals indicating an emergency event;
providing an alert output responsive to said emergency alert signals; and
receiving tactile user inputs to control said emergency alert function via a single user input button, wherein said single user input button is the only tactile user input means integral with said apparatus that is capable of controlling said emergency alert function; and
responsive to said single user input button being depressed when said television signal receiver is in an "off" state and said emergency alert function is activated, turning said television signal receiver on and presenting information based on said emergency alert signals, and responsive to a second depression of said single user input button, returning said television signal receiving apparatus to an "off" state wherein said single user input button includes: a plurality of different states; and said apparatus performs one or more operations responsive to each of said states based on user programming.

8. The method of claim 7, further comprised of illuminating said single user input button based on a severity level of said emergency event.

9. The method of claim 8, wherein said illuminating step includes illuminating said single user input button using:
a first color if said severity level represents a first level;
a second color if said severity level represents a second level; and
a third color if said severity level represents a third level.

10. The method of claim 9, further comprised of combining each of said first, second and third colors with a fourth color.

11. The method of claim 10, further comprised of illuminating said single user input button using only said fourth color when said emergency alert function is not activated.

12. The method of claim 8, wherein said illuminating step includes illuminating said single user input button using:
two colors if said severity level represents a first level;
three colors if said severity level represents a second level; and
four colors if said severity level represents a third level.

13. A television signal receiver having an emergency alert function, comprising:
a tuner operative to tune a channel frequency that provides emergency alert signals indicating an emergency event;
a processor operative to enable an alert output responsive to said emergency alert signals; and
a single user input button for receiving tactile user inputs to control said emergency alert function, wherein said single user input button is the only tactile user input element integral with said television signal receiver that is capable of controlling said emergency alert function;
wherein, responsive to a first depression of said single user interface button when said television signal receiver is in an "off" state and said emergency alert function is activated, said processor performs steps comprising turning said television signal receiver to an "on" state and presenting information based on said emergency alert signals, and wherein, responsive to a second depression of said single user input button, said processing means cause said television signal receiving apparatus to be returned to an "off" state wherein said single user input button includes: a plurality of different states; and said television signal receiver performs one or more different operations responsive to each of said states based on user programming.

14. The television signal receiver of claim 13, further comprising a light operative to illuminate said single user input button based on a severity level of said emergency event.

15. The television signal receiver of claim 14, wherein said light illuminates said single user input button using:
a first color if said severity level represents a first level;
a second color if said severity level represents a second level; and
a third color if said severity level represents a third level.

16. The television signal receiver of claim 15, wherein said first, second and third colors are each combined with a fourth color.

17. The television signal receiver of claim 16, wherein said light (31) illuminates said single user input button using only said fourth color when said emergency alert function is not activated.

18. The television signal receiver of claim 14, wherein said light illuminates said single user input button using:
two colors if said severity level represents a first level;
three colors if said severity level represents a second level; and
four colors if said severity level represents a third level.

\* \* \* \* \*